US012711509B2

(12) United States Patent
Kala et al.

(10) Patent No.: US 12,711,509 B2
(45) Date of Patent: Aug. 18, 2026

(54) SYSTEMS AND METHODS FOR IMPROVED FRAUD DETECTION

(71) Applicant: Visa International Service Association, San Francisco, CA (US)

(72) Inventors: Durga S. Kala, San Francisco, CA (US); Kenny Tsai, San Francisco, CA (US); Juharasha Shaik, San Francisco, CA (US); Aditi Khare, San Francisco, CA (US)

(73) Assignee: Visa International Service Association, San Francisco, CA (US)

(*) Notice: Subject to any disclaimer, the term of this patent is extended or adjusted under 35 U.S.C. 154(b) by 100 days.

(21) Appl. No.: 18/534,178

(22) Filed: Dec. 8, 2023

(65) Prior Publication Data

US 2024/0104574 A1 Mar. 28, 2024

Related U.S. Application Data

(62) Division of application No. 16/569,117, filed on Sep. 12, 2019, now Pat. No. 11,875,350.

(51) Int. Cl.

*G06Q 20/40* (2012.01)
*G06N 20/20* (2019.01)
*G06Q 20/42* (2012.01)

(52) U.S. Cl.

CPC ......... *G06Q 20/4016* (2013.01); *G06N 20/20* (2019.01); *G06Q 20/425* (2013.01)

(58) Field of Classification Search

None

See application file for complete search history.

(56) References Cited

U.S. PATENT DOCUMENTS 10,482,464 B1 11/2019 Dietrich et al.
10,867,303 B1 * 12/2020 Manapat .............. G06Q 20/405
2012/0226613 A1 9/2012 Adjaoute
2012/0239557 A1 9/2012 Weinflash et al.

(Continued)

FOREIGN PATENT DOCUMENTS

WO WO-2018006060 A1 * 1/2018 ......... G06Q 20/4093

OTHER PUBLICATIONS

Rieke, R., et al., "Fraud Detection in Mobile Payments Utilizing Process Behavior Analysis", 2013 International Conference on Availability, Reliability and Security (2013, pp. 662-669) (Year: 2013).*

*Primary Examiner* — Clay C Lee
(74) *Attorney, Agent, or Firm* — K&L Gates LLP

(57) ABSTRACT

A computer-implemented method comprising providing a graphical user interface for user selection of fraud rules that comprises fraud transaction parameters determined based on transaction parameters included in a plurality of known fraudulent transactions. The GUI also comprises high risk merchants with a fraud rate that exceeds a threshold fraud rate. The method includes receiving a user selection of fraud rules relating to at least the fraud transaction parameters, the high risk merchants, and the high frequency merchants. The method includes receiving test transaction data including at least one transaction parameter and at least one merchant associated with the test transaction, applying the fraud rules to the received transaction data to identify probable fraudulent transactions.

19 Claims, 5 Drawing Sheets

(56) References Cited

U.S. PATENT DOCUMENTS

| | | | | |
|---|---|---|---|---|
| 2014/0081652 | A1 | 3/2014 | Klindworth | |
| 2016/0019613 | A1 | 1/2016 | Roof et al. | |
| 2016/0063065 | A1 | 3/2016 | Khatri et al. | |
| 2016/0125529 | A1* | 5/2016 | Acharya | G06Q 40/03<br>705/38 |
| 2018/0053188 | A1* | 2/2018 | Zoldi | G06Q 20/102 |
| 2019/0188720 | A1 | 6/2019 | Williams et al. | |
| 2019/0311361 | A1 | 10/2019 | Kumar et al. | |
| 2019/0378050 | A1 | 12/2019 | Edkin et al. | |
| 2019/0392450 | A1* | 12/2019 | Gosset | H04L 63/083 |
| 2020/0211021 | A1* | 7/2020 | Allbright | G06N 20/10 |
| 2020/0372509 | A1* | 11/2020 | Phalnikar | G06N 20/00 |
| 2021/0081948 | A1 | 3/2021 | Kala et al. | |
| 2021/0174415 | A1 | 6/2021 | Narasimhan et al. | |
| 2023/0316284 | A1* | 10/2023 | Kramme | G06Q 20/34<br>705/44 |
| 2025/0005587 | A1* | 1/2025 | Yerradoddi | G06Q 20/4016 |

* cited by examiner

SYSTEMS AND METHODS FOR IMPROVED FRAUD DETECTION

CROSS-REFERENCE TO RELATED APPLICATIONS

This application is a divisional application claiming priority under 35 U.S.C. § 121 to U.S. patent application Ser. No. 16/569,117, filed Sep. 12, 2019, entitled SYSTEMS AND METHODS FOR IMPROVED FRAUD DETECTION, the entire contents of which are incorporated herein by reference.

FIELD

The disclosure relates generally to identifying fraudulent transactions.

BACKGROUND

Issuers and other payment account providers or processors may monitor transactions for indications that attempted transaction may be fraudulent or otherwise resulting from suspicious activity. In some instances, the payment account provider may detect factors or circumstances of a transaction or pending transaction. In some instances, the payment account provider may take actions to flag or prevent a transaction depending on the particular circumstances.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In some embodiments, the disclosure describes a computer implemented method for identifying transaction parameters corresponding to fraudulent transactions. The method may include providing a graphical user interface for a user to select among fraud rules that pertain to known transaction parameters that may pertain to fraudulent transactions. In some embodiments, the method may include determining which merchants are high risk merchants and which are high frequency merchants, and selecting fraud rules based on that designation.

BRIEF DESCRIPTION OF THE DRAWINGS

The disclosure may be better understood by references to the detailed description when considered in connection with the accompanying drawings. The components in the figures are not necessarily to scale, emphasis instead being placed upon illustrating the principles of the disclosure. In the figures, like reference numerals designate corresponding parts throughout the different views.

Figure 1:
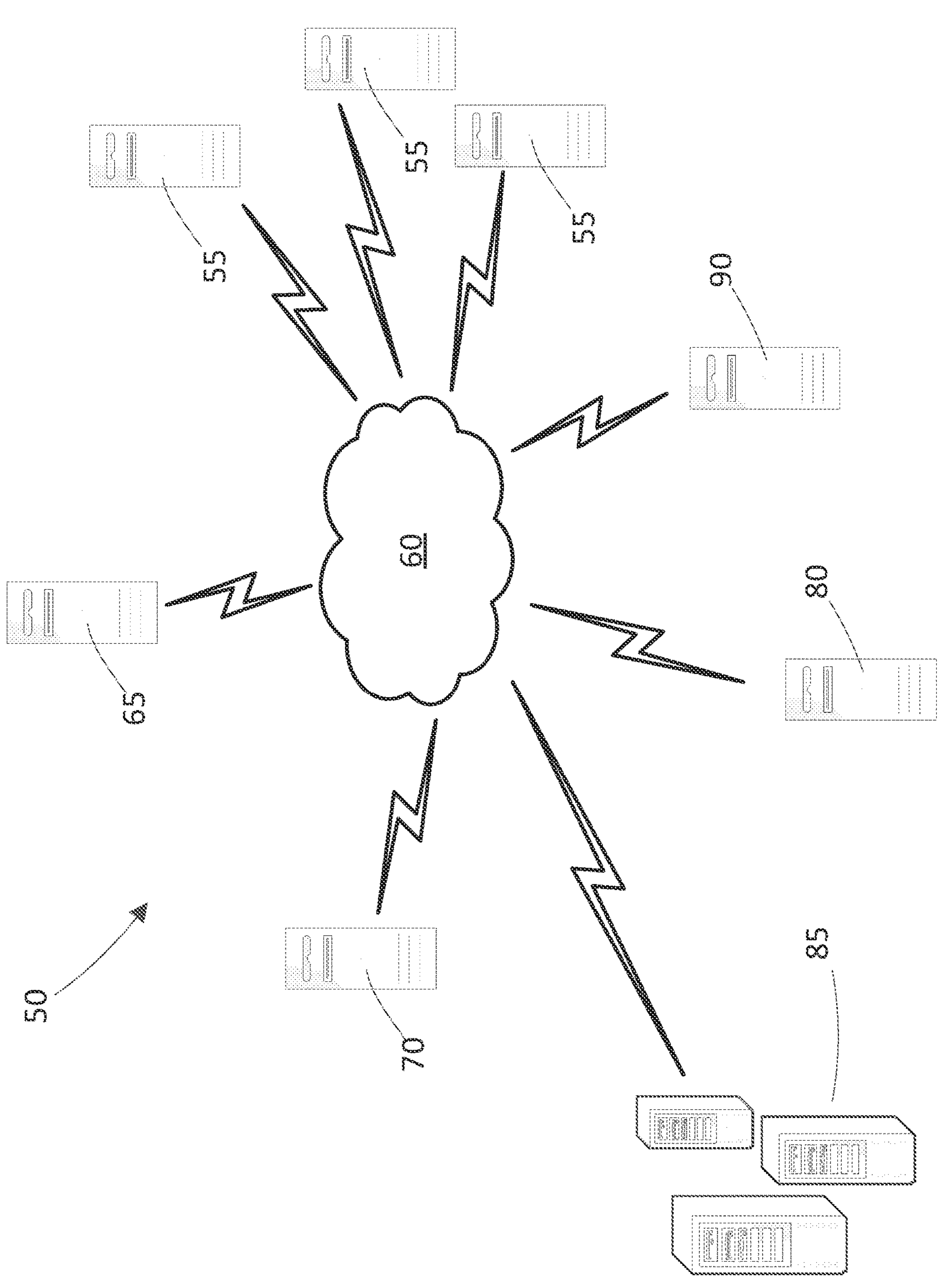
FIG. 1 is an illustration of the elements of an embodiment of a system that includes a risk management system as described herein.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present disclosure now will be described more fully hereinafter with reference to the accompanying drawings, which form a part hereof, and which show, by way of illustration, specific exemplary embodiments by which the disclosure may be practiced. These illustrations and exemplary embodiments are presented with the understanding that the present disclosure is an exemplification and is not intended to be limited to any one of the embodiments illustrated. The disclosure may be embodied in many different forms and should not be construed as limited to the embodiments set forth herein; rather, these embodiments are provided so that this disclosure will be thorough and complete, and will fully convey the scope of the disclosure to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Issuers and other payment providers may monitor customer transactions to detect whether any particular payment or other transaction may be the result of or attempt at fraud. In some embodiments, potentially fraudulent transactions may be detected based on varying types of fraud rules applied to each transaction's particular circumstances. In some embodiments, real-time rules (RTD) may be applied to transactions in progress to determine, in substantially real time, whether the transaction should be authorized or denied based on the outcome of the rules application. In some embodiments, case creation (CC) rules may include creating a "case" that marks a suspicious transaction a suspect transaction to determine an appropriate follow-up action for the transaction. In such embodiments, the follow-up may include manual review to determine appropriate action, or may include analysis using additional rules.

In some embodiments of the disclosure, a payment processor or other entity (e.g., an issuer) may provide a risk management system including a risk management platform for issuers or other payment providers to establish or otherwise create rules to identify fraudulent or otherwise suspect transactions. The risk management platform may help issuers or other entities optimize fraud loss prevention and maximize profitability by providing its clients with an effective transaction risk management decision system In some embodiments, issuers may use the risk management platform to create or select rules using a graphical user interface (GUI) for detecting and/or taking action relating to suspected fraudulent transactions. In some embodiments, the risk management platform may allow issuers or other entities to validate rules using test data from past transactions to confirm whether the created rules may be effective in detecting fraudulent activity. Accordingly, if the fraud rules created tend to be successful in detecting an acceptable threshold number or percentage of fraudulent transactions in the test data, the issuer may be fairly confident that the rules will be similarly effective for real-life transactions moving forward. Likewise, if the tested fraud rules fail to detect a threshold number or percentage of fraudulent transactions in the test data, the issuer may determine that the rules should be altered or replaced.

In some embodiments, the disclosure describes a computer-implemented method comprising receiving fraudulent transaction data from a fraud server including one or more transaction parameters for a plurality of known fraudulent transactions. Based on the one or more transaction parameters included in the plurality of known fraudulent transactions, the method may include determining one or more fraud transaction parameters. The method may include receiving transaction data for a plurality of merchants from a merchant data server, and determining one or more high frequency merchants of the plurality of merchants and one or more high risk merchants of the plurality of merchants based on the transaction data. The method may include receiving test transaction data from a transaction data server including one or more test transaction parameters for a plurality of test transactions. The method may include providing a graphical user interface including one or more fraud rules for selection by a user, where the one or more fraud rules each relates to at least the one or more fraud transaction parameters, high frequency merchants, or high risk merchants. The method may also include receiving one or more user selections of the one or more fraud rules and applying the selected one or more fraud rules to the test transaction data to determine one or more suspected fraudulent transactions in the test transaction data.

In another embodiment, the disclosure may describe a computer-implemented method comprising providing a graphical user interface for user selection of fraud rules that comprises fraud transaction parameters determined based on transaction parameters included in a plurality of known fraudulent transactions. The GUI also comprises high risk merchants with a fraud rate that exceeds a threshold fraud rate. The method includes receiving a user selection of fraud rules relating to at least the fraud transaction parameters, the high risk merchants, and the high frequency merchants. The method includes receiving test transaction data including at least one transaction parameter and at least one merchant associated with the test transaction, applying the fraud rules to the received transaction data to identify probable fraudulent transactions.

In another embodiment, the disclosure may describe computer-implemented method comprising receiving fraudulent transaction data including one or more transaction parameters for a plurality of known fraudulent transactions. Based on the one or more transaction parameters included in the plurality of known fraudulent transactions, the method may include determining one or more fraud transaction parameters. The method may include receiving test transaction data including one or more test transaction parameters for a plurality of test transactions, wherein each of the plurality of test transactions may be associated with a merchant. The method may include determining one or more high risk merchants based on the test transaction data, wherein each of the one or more high risk merchants are merchants associated with a fraud rate that exceeds a threshold fraud rate. The method may include providing a graphical user interface including one or more fraud rules for selection by a user. The one or more fraud rules each may related to at least one of the one or more fraud transaction parameters or the one or more high risk merchants. The method may include receiving one or more user selections of the one or more fraud rules, and applying the selected one or more fraud rules to the test transaction data to determine one or more suspected fraudulent test transactions in the test transaction data. The suspected fraudulent test transactions may have a risk level that exceeds a threshold risk level. The method may include determining a fraud detection rate based on the determined number of suspected fraudulent test transactions and the number of known fraudulent transactions in the test transaction data.

A high level illustration of some of the elements in a sample computing system 50 that may be physically configured to implement the risk management system and process is illustrated in FIG. 1. Various computer servers may be connected via a digital communication network 60, such as one or more merchant servers 55, a fraud server 70, a transaction data server 65, an issuer server 80, and a merchant data server 90. The servers may interface with a digital communications network, such as the digital communication network 60. Connection to the digital communication network 60 may be wired or wireless, and may be via the internee or via a cellular network or any other suitable connection service. In some embodiments, any of the servers may alternatively be or include any number of computing devices, such as smart phones or tablet computers, mobile computing devices, wearable mobile devices, desktop computers, laptop computers, or any other computing devices. A risk management server 85 may also be connected to the network 60, and may represent, for example, a payment servicer, a credit card issuer, a bank, a payment processor, or another financial institution. In some embodiments, the fraud server 70 and the transaction data server 65 may be part of the risk management server 85. Various of these servers or computer entities may also be connected through a secure payment network, or the digital communication network 60 may be a payment network. The payment network may be an electronic payment system used to accept, transmit, or process transactions made by users with payment cards for money, goods, or services, and to transfer information and funds among payment card issuers, merchants, payment card holders, payment processors, acquirers, etc. In the illustrated embodiment, at least one merchant server 55, the risk management server 85, the issuer server 80, and the risk management server 85 may be connected via the payment network, but it is contemplated that other entities, such as acquirers, issuers, or token managers, may be connected as well. In some embodiments, the issuer server 80 may be a controlled by a bank, payment account issuer, or credit card issuer.

Figure 2:
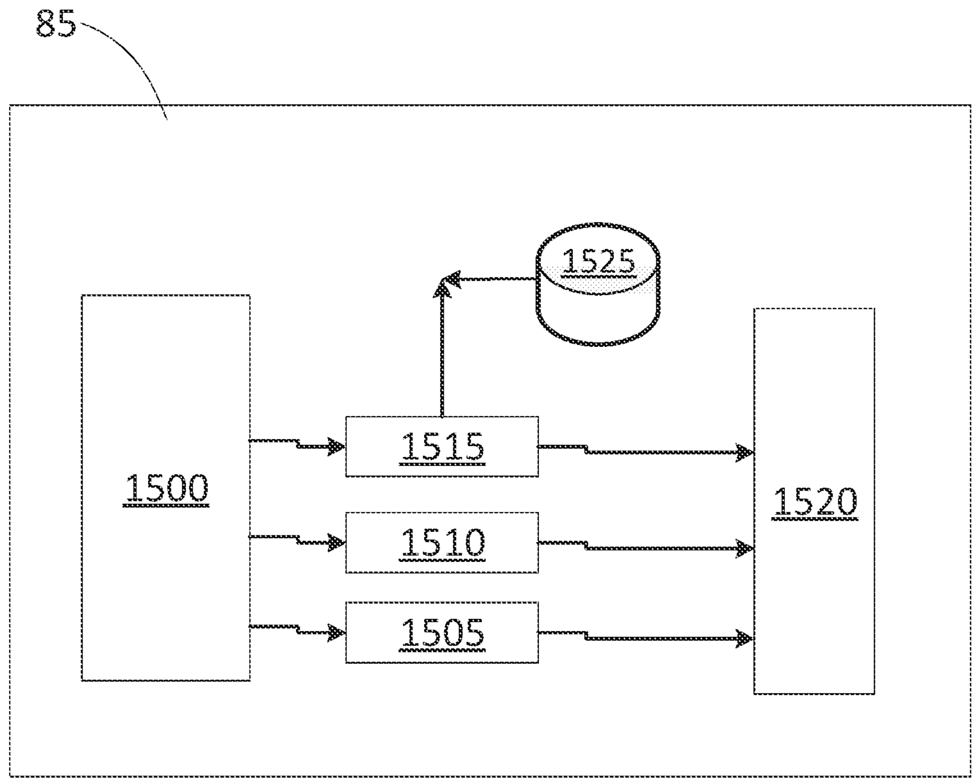
FIG. 2 is a schematic illustration of elements of an embodiment of a server type computing device.

FIG. 2 is a simplified illustration of the physical elements that make up an embodiment of a server type computing device, such as the merchant servers 55, the issuer server 80, and/or the risk management server 85, may reflect similar physical elements in some embodiments. The physical elements that make up an embodiment of a server, such as the risk management server 85, are further illustrated in FIG. 2. In some embodiments, the risk management server is specially configured to run the risk management system as described herein. At a high level, the risk management server 85 may include a digital storage such as a magnetic disk, an optical disk, flash storage, non-volatile storage, etc. Structured data may be stored in the digital storage such as in a database. More specifically, the server 85 may have a processor 1500 that is physically configured according to computer executable instructions. In some embodiments, the processor 1500 can be specially designed or configured to optimize communication between an issuer server, such as the issuer server 80, and the server 85 relating to the risk management system as described herein. The server 85 may also have a sound and video module 1505 which assists in displaying video and sound and may turn off when not in use to conserve power and battery life. The server 85 may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with the networks, such as communication network 60 and payment network, either through wireless or wired devices. In some embodiments, a risk management controller for running a risk management application or API may be located on the issuer server 80. However, in other embodiments, the risk management controller may be located on risk management server 85, or both the issuer server 80 and the server 85. Of course, this is just one embodiment of the risk management server 85 and additional types of servers are contemplated herein.

In the embodiment illustrated in FIG. 1, the risk management server 85 may be connected to the merchant servers 55 and/or issuer server 80 either through the digital communication network 60, through the payment network or through other connections. In some embodiments, the merchant servers 55 may be associated with any type of merchant offering goods or services for purchase with payment cards, such as payment cards offered by an issuer, whether those purchases are online or otherwise. For online purchases, the merchant server 55 or a group of servers may host a merchant website where the merchant's goods or services may be purchases by a user. In some embodiments, payments may occur business-to-business (B2B) between merchants may be domestic or across national borders.

In some embodiments, the risk management system may be hosted on or otherwise run by the risk management server 85 under the control of a risk management service or payment processor. In some embodiments, the risk management system may be hosted by another entity, such as an issuer using an issuer server 80 or a merchant using a merchant server 55. The servers 55, 80, 65, 70 may be able to communicate with a plurality of other servers, such as the risk management server 85, and the one or more other merchant servers 55. The servers may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the server or may be through a digital communication network 60 such as cellular service, through the Internet, through a private network, through Bluetooth, etc.

In some embodiments, the risk management server 85 may be associated with the risk management system, and may send and receive information to and from the issuer server 80, the merchant servers 55, the fraud server 70, the transaction data server 65, etc. Specifically, software may be included on the servers allowing notifications to be received from the risk management system via the digital communications network 60. In some embodiments, the software may be an application through which a user may complete transactions, such as banking, money transfer, merchant purchases, etc. In some embodiments, the software may be an add-on to a web browser included on the user servers. In some embodiments, the risk management system's software may be an application installed on the server that allows for the use of other applications on the server, such as applications provided by payment processor, issuer, bank, merchant, email service, payment provider, etc. In some embodiments, the servers may communicate with the risk management server 85 via one or more application programming interfaces (APIs).

Figure 3:
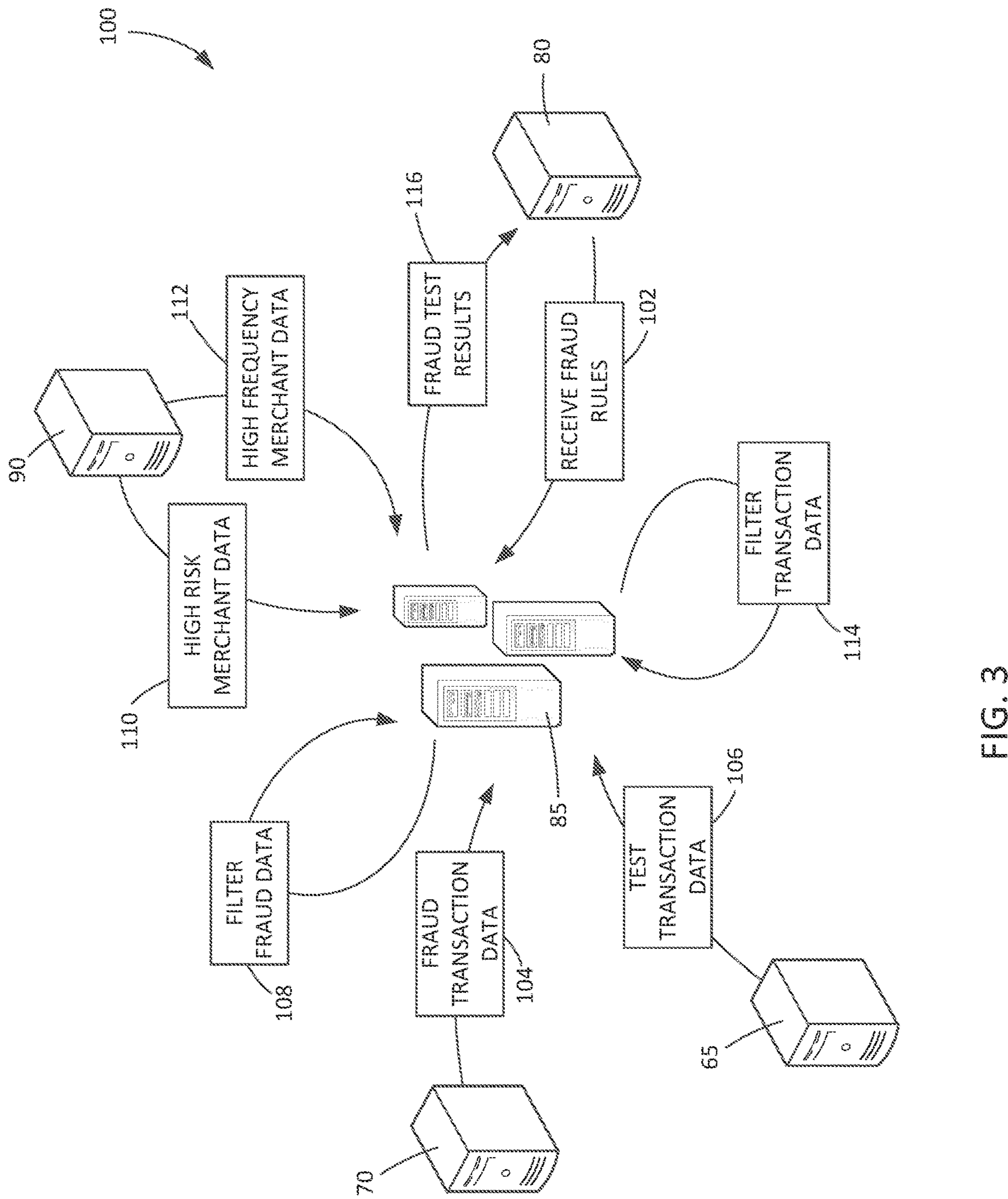
FIG. 3 is data flow diagram of an embodiment of the risk management system described herein.

FIG. 3 shows a data flow diagram 100 of an embodiment of using the risk management system described herein. In some embodiments, the data flow illustrated may take place as an iterative process, and certain steps may take place at different times or at a variety of times throughout the process. At 102, the risk management server 85 may receive selected fraud rules from an issuer server 80. In some embodiments, the fraud rules may be selected by a user at the issuer via a risk management user interface (UI) or graphical user interface (GUI). The GUI may be provided as a web portal via an API, or another suitable application. In some embodiments, the risk management GUI may be used by issuers to test how selected fraud rules may affect the results of the fraud detection methods and algorithms described herein. For example, as described below, an issuer may select thresholds or upper/lower bounds to define particular levels of risk associated with a transaction. The test transaction data may be used to test the selected fraud rules, for example, to determine what proportion of known fraudulent transactions in the test transaction data (e.g., the fraud data) were identified correctly, and/or how many false positives (e.g., non-fraudulent transaction identified as fraudulent under the fraud rules) are identified by the fraud rules. Once an issuer is satisfied with the test results, the issuer may apply the fraud rules to live transactions on an ongoing bases to help detect new fraudulent transactions and take action.

At 104, the risk management server 85 may receive fraudulent transaction data from the fraud server 70. At 106, the risk management server 85 may receive test transaction data from the transaction data server 65. In some embodiments, the fraud server 70 and/or the transaction data server 65 may be a part or partition of the risk management server 85, or may be a database stored within the risk management server or in another suitable location. The fraud data may include a set of transactions that have previously been found to be fraudulent. In some embodiments, the contents of the fraud transaction data may be updated regularly, such as on a daily basis, a weekly basis, a monthly basis, continually, etc. The test transaction data may include data on a wide set of transactions that may be processed for substantially any kind of transaction. In some embodiments, the same payment processing entity that controls the risk management system may process the transactions included in the test transaction data. In some embodiments, the test transaction data may be updated regularly, such as on a daily basis, a weekly basis, a monthly basis, continually, etc. In some embodiments, the test transaction data may be combined in a customized daily history data file. In some embodiments, a subset of cross-border transactions may be filtered out of the total set of transaction data to create a set of transaction data that only includes transactions with merchants in other countries.

At 108, the risk management server 85 may analyze the fraud data to filter out fraud transaction parameters that may be frequently identified as a trigger for a probable fraudulent transaction. In other words, the one or more fraud transaction parameters may be those parameters included in the fraud transaction data that tend to correspond with a fraudulent transaction. In some embodiments, the one or more fraud transaction parameters may be identified using machine learning techniques, such as decision trees, ensemble learning methods, random forest, etc. Random forest may be used as an algorithm to identify a list of fraud transaction parameters (categorical and non-categorical) that may have a relatively high influence on identifying fraudulent transactions. In some embodiments, certain types of fraudulent transaction parameters may include sender account number, merchant name, merchant category code (MCC), transaction amount date/time, transaction amount, issuing country code, recipient country code, etc. Of course, those skilled in the art will recognize that additional parameters may be used as well.

A set of exemplary training methodology algorithms is shown below for determining the one or more fraud parameters that may correspond to increased probability that a transaction may be fraudulent. In the example below, a random forest algorithm is shown as an example, with a training data set comprising: 1) test transaction data as Data Set A; and 2) previously confirmed fraudulent transaction data as Data Set B. The test transaction data may include a wide set of substantially all available transaction data of which the fraudulent transaction data may be a subset. A new unified transaction dataset based on Data Set A and Data Set B may be described as:

$$A \text{ with(Marking of } B)===a \in A$$

This unified transaction dataset may serve as a training data set for the random forest model. The training methodology may include fraud marking of each transaction in the data set to indicate the fraud parameters included in each particular transaction and to what level that parameter is present. For example, the algorithm below may include reference to the following parameters and their shorthand:

```
      Authorized Transaction (from test transaction data) - AT
      Transation Identifier (TransctionID) - td
      Transaction Amount (TranAmount) - TA
For each Transaction - a ∈ A
.function (AT, td)
{
if(AT [TA] == Fraud[TA] && AT[TranID]==Fraud[TranID]):
         return (Fraud Match Level 1)
TranAmt Level 2 [Upper and Lower Bounds]
      if : (AT[TranAmount ], TranAmount * 1/100])
         return (Fraud Match Level 2)
TranAmt Level 3 [Upper and Lower Bounds]
      if : (AT[TranAmount ], TranAmount * 5/100])
         return (Fraud Match Level 3)
TranAmt Level 4 [Upper and Lower Bounds]
      if : (AT[TranAmount ], TranAmount * 7/100])
         return (Fraud Match Level 4)
TranAmt Level 5 [Upper and Lower Bounds]
      if : (AT[TranAmount ], TranAmount * 10/100])
         return (Fraud Match Level 5)
return Match Level None
}
```

As shown in the above exemplary algorithm, individual transactions may be marked corresponding to different levels of fraud likeliness, such as Fraud Match Level 1, Fraud Match Level 2, Fraud Match Level 3, Fraud Match Level 4, or Fraud Match Level 5. The fraud levels may be found corresponding to any of a number of transaction parameters. For example, the algorithm above uses the transaction amount (TransAmount) parameter, but the full algorithm would take many or all of the potential transaction parameters into account, assigning each a fraud level as appropriate. In the above example, upper and lower bounds for transaction amounts may be set to determine which fraud level to assign. Specifically, TranAmt Level 2 may result in Fraud Match Level 2, TransAmt Level 3 may result in Fraud Match Level 3, etc, where higher transaction amounts may indicate higher risk of fraud. In some embodiments, the specific upper and lower bounds for each transaction amount level may be automatically set by the risk management system, or in some embodiments may be selected by a user via the risk management GUI fraud rules selection. Similar processes of fraud rule selection may be used for additional transaction parameters, particularly those fraud parameters that are determined to be most likely associated with fraudulent transactions. In such embodiments, particular issuers may customize their fraud detection through the risk management GUI and the particular fraud parameters found to be the most likely indicators of fraudulent transactions. For example, the risk management GUI may indicate that transaction amount is a fraud parameter often corresponding with fraudulent transactions. An issuer may set particular upper and lower bounds corresponding to particular risk of fraud levels based on that particular issuer's preferences or client needs. Thus, referring back to 108 in FIG. 3, filtering fraud data may include determining fraud parameters using the example algorithm above or another suitable algorithm.

Referring to FIG. 3, the risk management server 85 may receive transaction data associated with a plurality of merchants from the merchant data server 90. As with the fraud server 70 and the transaction data server 65, the merchant data server 90 may be part of the risk management server 85, or may be a database storing transaction data for merchants. In some embodiments, the merchant transaction data may be included in the test transaction data. At 110 and 112, either the merchant data server 90 or the risk management server 85 may filter the merchant transaction data to determine high risk merchants (110) and/or high frequency merchants (112). In some embodiments, the merchant data server 90 may filter the merchant transaction data and transmit the data for each category of high risk merchants, at 110, and high frequency merchants, at 112, to the risk management server 85. In some embodiments, the merchant data server 90 may transmit all the merchant transaction data to the risk management server 85, which may filter the data to determine the merchants in each category. In some embodiments, the determination of whether each of the plurality of merchants may be a high risk merchant or a high frequency merchant may be based only on cross-border transactions (e.g., transactions with merchants or entities in countries other than the United States).

The one or more high risk merchants of the plurality of merchants may be determined based on the merchant transaction data. In some embodiments, the high risk merchants may be the merchants of the plurality of merchants having relatively high identified fraudulent transactions based on overall merchant transaction volume. In some embodiments, this fraud determination rate may be determined using the fraud transaction data. In some embodiments, the high risk merchants may be identified as those merchants of the plurality of merchants that have a fraud rate that exceeds a threshold fraud rate, where the fraud rate may be defined as a number of transactions previously determined to be fraudulent per total transactions. In some embodiments, the fraud rate may be determined only based on cross-border transactions if a particular risk assessment may be focused primarily or completely on cross-border transactions. The threshold fraud rate may be set automatically by the risk management system, or may be selected by an issuer, for example, via the risk management GUI. In some embodiments, multiple fraud rate thresholds may be set to correspond with escalating levels of fraud risk. For example, a exceeding a first fraud rate threshold may correspond to a fraud rate level 1, exceeding a second fraud rate threshold may correspond to a fraud rate level 2, etc. In some embodiments, an issuer may select thresholds to best accommodate its client base or the types of transactions with which the particular issuer may be involved.

The one or more high frequency merchants may be determined based on the merchant transaction data in a similar manner to the high risk merchants. For example, in some embodiments, the high frequency merchants may be the merchants of the plurality of merchants who have been involved in a relatively high number of transactions. In some embodiments, the high frequency merchants may be identified as those merchants of the plurality of merchants that have a transaction total that exceeds a high frequency threshold. In some embodiments, the high frequency merchants may be determined only based on cross-border transactions, particularly if a particular risk assessment may be focused primarily or completely on cross-border transactions. The high frequency threshold may be set automatically by the risk management system, or may be selected by an issuer, for example, via the risk management GUI. In some embodiments, multiple high frequency thresholds may be set to correspond with escalating levels of fraud risk. For example, a exceeding a first high frequency threshold may correspond to a fraud rate level 1, exceeding a second high frequency threshold may correspond to a fraud rate level 2, etc. In some embodiments, an issuer may select thresholds to best accommodate its client base or the types of transactions with which the particular issuer may be involved. In some embodiments, only one of high frequency merchants or high risk merchants may be selected, depending on the issuer's preference.

The example algorithm portion shown below may be used to determine and identify one or more merchants of the plurality of merchants associated with merchant transaction data for one or more high risk merchants (HRM).

```
function(List[High Risk Merchants] HRM, List[Low Risk Merchants]
LRM, List[Merchant Category Codes with Risk] MCC)
{
If (Transaction[MerchantName] IN List[HRM])
        return Merchant Risk Level 1.
if(Transaction[MerchantName] IN List[LRM])
{
  if Transaction[MerchantCategoryCode] in List[MCC])
    return Merchant Risk Level 2
}
if(Transaction[MerchantCategoryCode] IN List [MCC])
{
  return Merchant Risk Level 3
}
       return Merchant Risk Level 4
}
```

In the example algorithm, a merchant risk level may be based on whether the merchant name associated with a transaction is found in a list of high risk merchants (HRM) or a low risk merchant (LRM) that each may have been previously populated based on, for example, a threshold fraud rate. The example algorithm may also identify transactions with an associated merchant category code (MCC) parameter in a list of merchant category code parameters that may have previously been identified as particularly indicative of high risk merchants and/or fraud (e.g., via fraud filtering process described above). Although MCC is the parameter used in the example algorithm, other parameters may be used as well. In the illustrated example algorithm, if the transaction data for a particular transaction indicates a merchant on a high risk merchant list, then the transaction may be marked with Merchant Risk Level 1 (relatively high risk). If the transaction data for a particular transaction indicates a merchant on a low risk merchant list and the MCC associated with the transaction is on a list of risky MCCs, then the transaction may be marked with Merchant Risk Level 2 (medium risk). If the transaction includes an MCC on the list of risky MCCs but does not appear on the HRM or LRM list, the transaction may be marked with Merchant Risk Level 3 (relatively low risk). Otherwise, the transaction may be marked with Merchant Risk Level 4 (not particularly risky). Although not illustrated in the example, similar methods or algorithms may be used to identify transactions associated with high frequency merchants. Thus, in this or similar manner, the risk management server 85 may filter merchant transaction data to identify high risk merchant data and/or high frequency merchant data.

At 114, the risk management server 85 may filter the transaction data to determine which transactions may carry a high probability of fraud based on the analysis above using, for example, an algorithm like the one below:

```
*/
Random Forest(Transaction DataSet A, Features F, DepthOfTree D,
BreadthOfTree B, MaxNoOfTrees tMax)
{
    forEach(a ∈ A) :
        forEach (d ∈ D):
            RandomizeTree(a,d,F,B)
                {
                    forEach( b ∈ B) : Tree(a,f ⊂ F, d) :
                        model.fit(f,tMax)
                }
}
Model.save( ) => Unit
```

The example random forest algorithm shown above may take the transaction data associated with each transaction marked using the above example algorithms and determine the transactions of the test transaction data associated with a risk level above an acceptable risk threshold. In some embodiments, the acceptable risk threshold may be set by an issuer using the risk management GUI. In some embodiments, this process may logically group the transactions associated with the fraud parameters resulting from filtering the fraud transaction data to the merchant transaction data received from the merchant data server 90. Each transaction may be evaluated with risk levels by analyzing the pattern of transaction parameters against the fraud parameters and merchant data.

At 116, the fraud test results may be transmitted to the issuer server 80 via the risk management GUI or other suitable methods. In some embodiments, the fraud test result may identify the proportion or percentage of known fraudulent transactions in the test transaction data were successfully identified using the fraud rules as selected by the issuer. The fraud test results may additionally identify the number of false positive results identified by under the selected fraud rules. If the issuer is satisfied with the results of the fraud test, the issuer may apply the selected fraud rules to new, live transactions. In some embodiments, the risk management GUI may provide selections for an issuer regarding actions to be taken once a new, live transaction is identified to be likely fraudulent. For example, in some embodiments, the transaction may be flagged for future review (case creation rule) or be authorized or denied in substantially real time (real-time rule). In some embodiments, the algorithms above may include a feedback loop for each transaction. In some embodiments, the relative importance of each transaction parameter may also be determined with a risk score generated within each decision tree based on a subset of parameters corresponding to the overall risk for a transaction that has completed one full settlement cycle.

Figure 4:
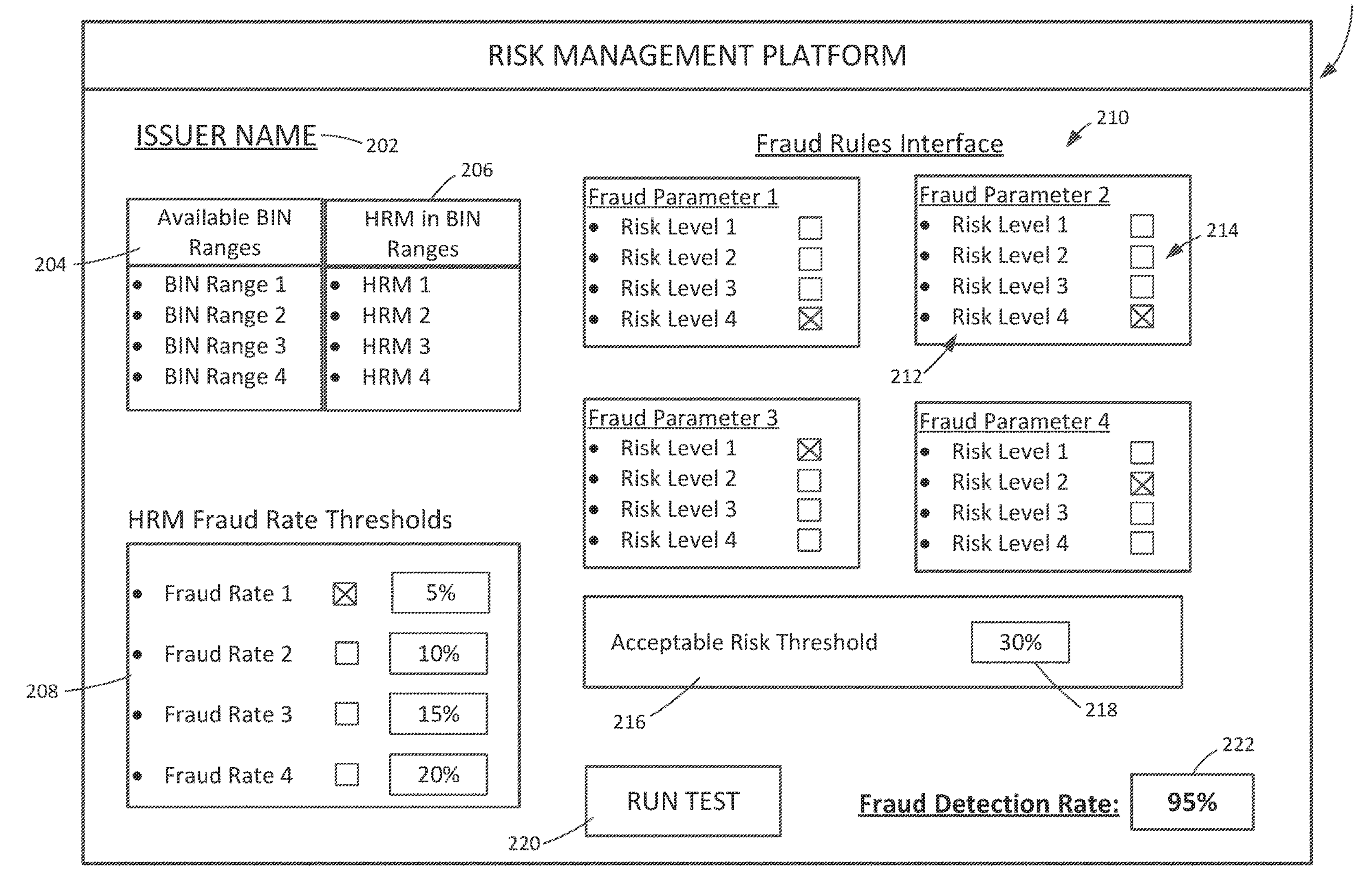
FIG. 4 is an embodiment of a graphical user interface for use with the risk management system described herein.

FIG. 4 shows an exemplary embodiment of a risk management graphical user interface (GUI) 200 that may be included as part of the risk management system described herein. The risk management GUI may, in some embodiments, provide bank identification number (BIN) ranges that a particular issuer may be entitled to access and may present, for example, the high risk merchants associated with the BIN ranges. In some embodiments, the GUI may additionally provide the transaction parameters that the risk management system may have determined to be most likely associated with fraudulent transactions. In some embodiments, the issuer may use the GUI to select from various levels of risk associated with those parameters.

Referring to FIG. 4, the risk management GUI 200 may include information relating to a particular issuer, such as issuer name 202, and available BIN ranges 204 that may be available to the particular issuer accessing the GUI 200. The GUI 200 may also include the high risk merchants (HRM) that may fall within the BIN ranges available to the issuer. In some embodiments, the merchants listed as HRMs may vary based on the HRM fraud rate thresholds 208 selected by the issuer. For example, if an issuer selects a relatively low fraud rate threshold (e.g., Fraud Rate 1), all the merchants with fraud rates over 5% may qualify as HRMs. In some embodiments, the fraud rate may be selected among options or entered directly into fraud rate fields. Those skilled in the art will understand that other suitable methods and selections may be used to determine the merchants qualifying as HRMs.

The GUI 200 may also include a fraud rules interface 210 that may include a list of fraud parameters found to most likely correspond to fraudulent transactions. For the purposes of illustration, generic fraud parameters (e.g., Fraud Parameters 1-4) are listed in the GUI 200, but transaction parameters such as MCC, Transaction Amount, etc., may be used. In some embodiments, the GUI 200 may provide a list of selectable fraud rules 212 for each identified fraud parameter. The fraud rules 212 may include a variety of selectable rules options, such as the risk level an issuer prefers for a particular parameter. For example, in some embodiments, selecting Risk Level 4 for Fraud Parameter 2 may indicate that the issuer prefers that the issuer's fraud detection system should be particularly sensitive to transactions associated with particular values of Fraud Parameter 2. On the other hand, selecting Risk Level 1 for Fraud Parameter 4 may indicate that the issuer prefers that the issuer's fraud detection system should have a relatively low sensitivity to transactions associated with particular values of Fraud Parameter 4. In some embodiments, the issuer may select a particular fraud rule using selection boxes 214, but other suitable selection method are also contemplated (e.g., pull down menus, etc.). Of course, those skilled in the art will understand that the fraud rules interface 210 represents only one exemplary embodiment of a manner of receiving selections of fraud rules, and that other suitable methods may be used that fall within the scope of the disclosure.

The GUI 200 may also provide for selecting an acceptable risk threshold 216 and a risk threshold field 218 for entering or otherwise selecting the issuer's preferred acceptable risk threshold. In some embodiments, the acceptable risk threshold may represent the maximum overall risk of fraud that an issuer is willing to accept before determining that a particular transaction should be marked as fraudulent or likely fraudulent, or marked for further review. In some embodiments, the overall risk for a particular transaction may be determined based at least partially on the fraud rate, the fraud parameters indicated, the determination that the associated merchant is a high frequency merchant and/or a high risk merchant, etc. For example, in some embodiments, the risk levels chosen for particular fraud parameters may reflect a risk weight to be assigned to the corresponding fraud parameter, where Risk Level 4 attributes more weight to a respective parameter than Risk Level 1, etc. Based on the combination of each fraud parameter associated with a particular transaction and that fraud parameters corresponding risk weight, the risk management system may determine the overall risk of the particular transaction. If the overall risk is below the selected acceptable risk threshold, the particular transaction may be determined to be legitimate (e.g., not fraudulent). If the overall risk is above the selected acceptable risk threshold, the particular transaction may be determined to be fraudulent. Those skilled in the art will appreciate that other suitable ways of determining an overall risk for each particular transaction may be used within the scope of the disclosure.

The GUI 200 may include a button 220 that may be selectable by the issuer to run a risk test using the selected fraud rules. In some embodiments, the risk test may include applying the selected one or more fraud rules to the test transaction data to determine one or more suspected fraudulent transactions in the test transaction data. In some embodiments, the risk test may determine a fraud detection rate 222 based on the proportion of fraudulent transactions are identified in the fraud test out of the number of known fraudulent transactions in the test transaction data. In some embodiments, the GUI 200 may also provide additional details based on percentages of false positive findings of fraudulent transactions (e.g., known legitimate transactions identified by the test as likely fraudulent). Based on the test results, the issuer may tweak the fraud rules, acceptable risk threshold, fraud rate thresholds, or other parameters in order to improve the fraud detection rate and minimize false positive findings.

Figure 5:
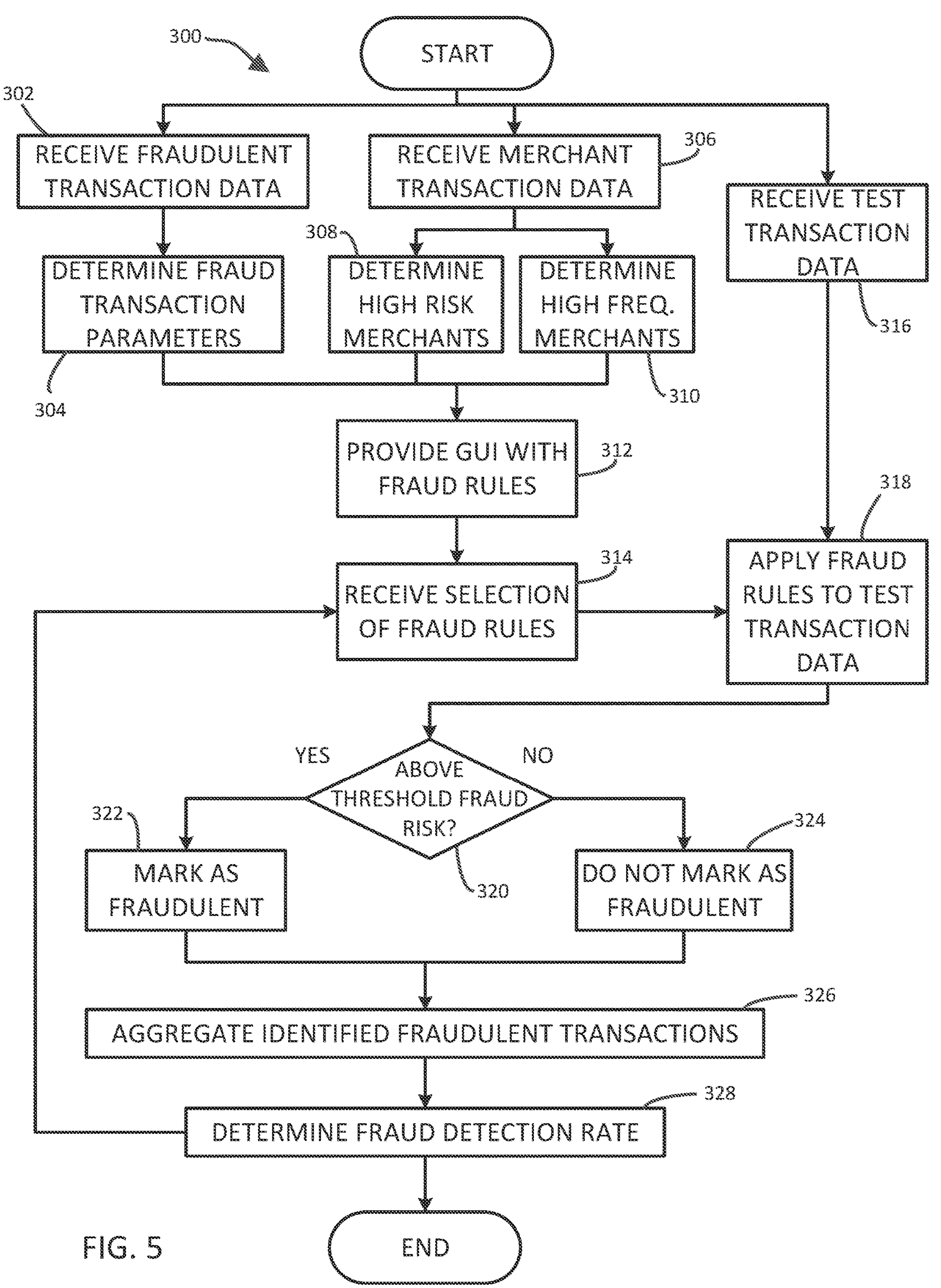
FIG. 5 is a flow chart of an embodiment of a method of using the risk management system described herein.

FIG. 5 is a flow chart 300 of an embodiment of a method of using the risk management system described herein. At 302, the method may include receiving fraudulent transaction data that may include one or more transaction parameters for a plurality of known fraudulent transactions. At 304, the method may include determining one or more fraud transaction parameters the presence of which may carry an increased likelihood that the associated transaction may be fraudulent. In some embodiments, determining the fraud transaction parameters may be achieved via machine learning, such as described in more detail above with reference to FIG. 3. At 306, the method may include receiving transaction data for a plurality of merchants as merchant transaction data. At 308, the method may include determining high risk merchants based on the merchant transaction data and, at 310, determining high frequency merchants based on the merchant transaction data. In some embodiments, the high risk merchants and high frequency merchants may be determined using methods described above with reference to FIG. 3. At 312, the method may include providing a risk management graphical user interface (GUI) that may include selection options for fraud rules. In some embodiments, the available fraud rules may be based on the fraud parameters identified based on the fraud transaction data and/or the determination of high risk or high frequency merchants. An exemplary risk management GUI is shown in FIG. 4, but other embodiments are also contemplated.

At 314, the method may include receiving a selection of one or more fraud rules via the risk management GUI. The selection of fraud rules may include an indication of an issuer's preferences regarding how to apply and/or interpret the presence of each fraud parameter. A more detailed description of an exemplary embodiment of selecting fraud rules is shown and described above with reference to FIG. 4. At 316, the method may include receiving test transaction data. In some embodiments, the test transaction data may include data from a large pool of transactions of which the fraudulent transaction data may be a subset. In some embodiments, the test transaction data may include one or more test transaction parameters for a plurality of test transactions. In some embodiments, the merchant transaction data may be from the same dataset as the test transaction data, or may be the same as the merchant transaction data. At 318, the method may include applying the selected fraud rules to the test transaction data to determine which test transactions may be fraudulent based on the selected fraud rules. In some embodiments, a particular test transaction may be considered fraudulent or likely fraudulent if the test transaction is found to have an overall fraud risk that exceeds an acceptable risk threshold that may be selected by the issuer as part of the fraud rules. If, at 320, a particular test transaction is determined to have an overall fraud risk that exceeds the threshold fraud risk, the test transaction may be marked as fraudulent or likely fraudulent at 322. If, at 320, a test transaction is determined to have an overall fraud risk that does not exceed the threshold fraud risk, the transaction may not be marked as fraudulent at 324. At 326, the method may include aggregating each of the test transactions marked as fraudulent and, at 328, determining a fraud detection rate. In some embodiments, the fraud detection rate may be determined based on the proportion or percentage of known fraudulent transactions in the test transaction data (e.g., the fraudulent transaction data) are properly identified as fraudulent or likely fraudulent using the fraud rules. In some embodiments, the fraud detection rate may be provided via the risk management GUI. In some embodiments, the issuer may adjust the selections of the fraud rules and run another test based on the updated fraud rules selections.

Thus, the disclosure describes a technical solution to the technical problem of detecting and identifying fraudulent transactions, particularly fraudulent transactions in a cross-border context where the merchant may be in another country. Among other features, the disclosure may include specifically identifying merchants that may be considered to carry a high risk of fraud based on the merchant's transaction history and previous known fraudulent transaction history. In some embodiments, identifying these high risk merchants may provide an additional parameter to increase the likelihood of detecting fraudulent transactions, particularly with cross-border transactions. Similarly, high frequency merchants may be identified and factored into the determination as to whether a particular transaction involving those merchants may be fraudulent. Accordingly, the risk management system and method described herein as the practical application of reducing fraudulent transactions using credit cards, debit cards, or other payment accounts. In some embodiments, the reduction may be particularly useful for in assessing the legitimacy of cross-border transactions with merchants in countries other than the United States.

The various participants and elements described herein may operate one or more computer apparatuses to facilitate the functions described herein. Any of the elements in the above-described Figures, including any servers, user terminals, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++ or Perl using, for example, conventional or object-oriented techniques. In some examples, the at least one processor may be specifically programmed.

The software code may be stored as a series of instructions, or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

It may be understood that the present disclosure as described above can be implemented in the form of control logic using computer software in a modular or integrated manner. Based on the disclosure and teachings provided herein, a person of ordinary skill in the art may know and appreciate other ways and/or methods to implement the present disclosure using hardware and a combination of hardware and software.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their fell scope or equivalents.

One or more features from any embodiment may be combined with one or more features of any other embodiment without departing from the scope of the disclosure. A recitation of "a", "an" or "the" is intended to mean "one or more" unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed (or physically configured) to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification and is not intended to be limited to any one of the embodiments illustrated.

The present disclosure provides a solution to the long-felt need described above. In particular, the system and the methods described herein may be configured more effectively identify and address potentially fraudulent payment transactions. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A computer-implemented method comprising:

applying, by a risk management server, fraudulent transaction data to a machine learning model to determine fraud transaction parameters associated with known fraudulent transactions;

transmitting, by the risk management server, a graphical user interface (GUI) data signal for accessing a GUI to an issuer server, wherein the GUI is to display selectable:

risk levels corresponding to the fraud transaction parameters;

threshold fraud rates; and acceptable risk thresholds;

receiving, by the risk management server from the issuer server, a rule selection data signal based on selections at the issuer server via the GUI, the rule selection data comprising:

a risk level selection;

a threshold fraud rate selection; and an acceptable risk threshold selection;

receiving, by the risk management server, a transaction data signal comprising live transaction data associated with live transactions being processed by the issuer server;

identifying, by the risk management server, first risky transactions from the live transactions based on the risk level selection and the fraud transaction parameters;

identifying, by the risk management server, high risk merchants associated with the live transactions based on the threshold fraud rate selection;

identifying, by the risk management server, second risky transactions from the live transactions, wherein the second risky transactions are associated with the high risk merchants;

analyzing, by the risk management server, the first risky transactions and the second risky transactions based on the acceptable risk threshold selection to identify live transactions that are suspected fraudulent transactions;

transmitting, by the risk management server, a transaction denial signal to the issuer server to cause the suspected fraudulent transactions to be automatically denied;

determining, by the risk management server, a fraud detection rate based on indicative of a proportion or a percentage of the known fraudulent transactions identified as suspected fraudulent transactions;

transmitting, by the risk management server, a fraud detection rate data signal to the issuer server for display via the GUI; and receiving, by the risk management server from the issuer server, an updated rule selection data signal based on updated selections at the issuer server via the GUI, the updated rule selection data comprising at least one of an updated risk level selection, an updated threshold fraud rate selection, or an updated acceptable risk threshold selection, and the updated rule selection data configured to increase the fraud detection rate.

2. The method of claim 1, further comprising:

identifying, by the risk management server, high frequency merchants associated with a transaction total that exceeds a transaction frequency threshold; and identifying, by the risk management server, third risky transactions from the live transactions, wherein the third risky transactions are associated with the high frequency merchants.

3. The method of claim 2, further comprising analyzing, by the risk management server, the third risky transactions based on the acceptable risk threshold selection to identify the suspected fraudulent transactions.

4. The method of claim 3, wherein the transaction frequency threshold is based on a rate of cross-border transactions that are fraudulent.

5. The method of claim 3, further comprising:

automatically selecting, by the risk management server, the transaction frequency threshold.

6. The method of claim 3, wherein the GUI is to further display selectable transaction frequency thresholds, the method further comprising:

receiving, by the risk management server from the issuer server, a selection for the transaction frequency threshold.

7. The method of claim 3, wherein the risk management server is a payment processor server.

8. The method of claim 3, wherein the risk management server is a payment servicer server.

9. The method of claim 1, wherein the fraud transaction parameters comprise a transaction ID, a transaction timestamp, a merchant category code, a transaction type, a merchant name, a sender account number, a transaction amount, a transaction date, transaction time, an issuing country code, or a recipient country code, or a combination thereof.

10. The method of claim 1, wherein the machine learning model comprises an ensemble learning model.

11. The method of claim 1, wherein the machine learning model comprises a decision tree model.

12. The method of claim 1, wherein the machine learning model comprises a random forest model.

13. The method of claim 1, wherein the risk management server is a payment processor server.

14. The method of claim 1, wherein the risk management server is a payment servicer server.

15. A computer-implemented method comprising:

applying, by a risk management server, fraudulent transaction data to a machine learning model to determine fraud transaction parameters associated with known fraudulent transactions, and wherein the known fraudulent transactions are associated with merchants;

generating, by the risk management server, a graphical user interface (GUI) for display via an issuer server, the GUI comprising:

risk levels corresponding to the fraud transaction parameters, threshold fraud rates, and acceptable risk thresholds;

receiving, by the risk management server from the issuer server via the GUI, a rule selection data signal comprising:

a risk level selection;

a threshold fraud rate selection; and an acceptable risk threshold selection;

receiving, by the risk management server, a transaction data signal comprising live transaction data associated with live transactions being processed by the issuer server;

identifying, by the risk management server, first risky transactions from the live transactions based on the risk level selection and the fraud transaction parameters;

identifying, by the risk management server, high risk merchants from the merchants based on the threshold fraud rate selection;

identifying, by the risk management server, second risky transactions from the live transactions, wherein the second risky transactions are associated with the high risk merchants;

analyzing, by the risk management server, the first risky transactions and the second risky transactions based on the acceptable risk threshold selection to identify suspected fraudulent transactions;

transmitting, by the risk management server, a transaction authorization signal to the issuer server to cause the first risky transactions and the second risky transactions satisfying the acceptable risk threshold selection to be automatically authorized;

determining, by the risk management server, a fraud detection rate based on indicative of a proportion or a percentage of the known fraudulent transactions identified as suspected fraudulent transactions; and receiving, by the risk management server from the issuer server via the GUI, an updated rule selection data signal, the updated rule selection data comprising at least one of an updated risk level selection, an updated threshold fraud rate selection, or an updated acceptable risk threshold selection, and the updated rule selection data configured to increase the fraud detection rate.

16. The method of claim 15, further comprising:

displaying, by the risk management server via the GUI, the fraud detection rate.

17. The method of claim 16, further comprising:

identifying, by the risk management server, high frequency merchants from the merchants, wherein the high frequency merchants are associated with a transaction total that exceeds a transaction frequency threshold; and identifying, by the risk management server, third risky transactions from the live transactions, wherein the third risky transactions are associated with the high frequency merchants.

18. The method of claim 17, further comprising analyzing, by the risk management server, the third risky transactions based on the acceptable risk threshold selection to identify the suspected fraudulent transactions.

19. A computer-implemented method comprising:

receiving, by a risk management server, transaction parameters for known fraudulent transactions;

identifying, by the risk management server, fraud transaction parameters by applying the transaction parameters to a machine learning model, wherein the fraud transaction parameters comprise ranges of fraud parameter values;

associating, by the risk management server, the ranges of fraud parameter values with risk levels;

receiving, by the risk management server from a transaction data server, test transaction parameters for test transactions corresponding to merchants;

classifying, by the risk management server, the merchants associated with a fraud rate that exceeds a threshold fraud rate as high risk merchants;

transmitting, by the risk management server, a graphical user interface (GUI) signal for accessing a GUI to an issuer server, wherein the GUI is to display:

the risk levels; and the high risk merchants;

receiving, by the risk management server from the issuer server, a risk level selection data signal based on a risk level selection at the issuer server via the GUI;

determining, by the risk management server, suspected fraudulent test transactions in the test transactions based on the risk level selection;

determining, by the risk management server, a fraud detection rate based on the suspected fraudulent test transactions and the known fraudulent transactions, the fraud detection rate indicative of a proportion or a percentage of the known fraudulent transactions identified as suspected fraudulent test transactions;

receiving, by the risk management server from the issuer server, an updated risk level selection data signal based on an updated risk level selection at the issuer server via the GUI, the updated risk level selection configured to increase the fraud detection rate;

receiving, by the risk management server, a transaction data signal comprising live transaction data associated with live transactions being processed by the issuer server;

analyzing, by the risk management server, the live transactions based on the risk level selection to identify suspected fraudulent live transaction in the live transactions; and transmitting, by the risk management server, a transaction denial signal to the issuer server to cause the suspected fraudulent live transactions to be automatically denied.

* * * * *